United States Patent [19]
Engstrom

[11] 3,825,908
[45] July 23, 1974

[54] SOLID STATE SWITCH STRUCTURE
[75] Inventor: Keith A. Engstrom, River Grove, Ill.
[73] Assignee: Illinois Tool Works Inc., Chicago, Ill.
[22] Filed: Feb. 2, 1973
[21] Appl. No.: 328,908

[52] U.S. Cl. .............................. 340/174 PM, 335/2
[51] Int. Cl. ............................................. G11c 11/06
[58] Field of Search.... 340/174 PM, 174 SP, 365 L, 340/365 Z; 335/206, 207, 222, 227; 307/88 R

[56] References Cited
UNITED STATES PATENTS
3,175,199  3/1965  Kilburn ....................... 340/174 PM
3,698,531  10/1972  Bernin ......................... 340/174 PM

*Primary Examiner*—James W. Moffitt
*Attorney, Agent, or Firm*—Olson, Trexler, Wolters, Bushnell & Fosse, Ltd.

[57] ABSTRACT

The embodiment of the invention disclosed herein is directed to a solid state switch structure which includes first and second spaced apart saturable magnetic cores. The cores are saturated in the presence of a magnetic field of given strength. A drive wire passes through both cores, and a pair of sense wires pass through both cores but are wound thereabout in opposite directions. The saturation of one of the magnetic cores causes an output signal from one sense wire of one polarity and an output from the other sense wire of the opposite polarity. Moving the magnet from adjacent one saturable magnetic core to adjacent the other saturable core reverses the polarity of the output signals at the sense wires. While moving the magnet between saturable magnetic cores a point is reached whereupon no output signal is sensed at either sense wire.

4 Claims, 3 Drawing Figures

PATENTED JUL 23 1974           3,825,908

SOLID STATE SWITCH STRUCTURE

BACKGROUND OF THE INVENTION

This invention relates generally to solid state switches, and more particularly to solid state switches using saturable magnetic cores with drive and sense wires passing therethrough. The saturable magnetic core may be cylindrical, rectangular, or toroidal in shape although the toroidal shape is currently preferred. The primary requirement is that the cores are closed loop magnetic structures of unitary configuration.

The recent development of solid state switches of the type having saturable magnetic cores and movable magnets associated therewith has substantially improved the reliability of the switching function of such structures as keyboards, and the like. Such solid state switches include drive and sense wires passing through the toroidal magnetic core and together therewith function as a transformer device when the permanent magnet is displaced therefrom sufficiently to unsaturate the core. However, when the toroidal core is saturated no transformer coupling occurs between the drive and sense wires. By displacing the magnet the magnetic core becomes unsaturated and allows transformer coupling to take effect between the drive wire and the sense wire. Switching action occurs when the core's transformer action is switched on or off with a magnet.

One of the problems of this type of solid state switch, i.e., a switch structure having a magnetic core, a drive line and a sense line, and a movable magnet, is that it is an analogue device. In other words, as a magnet is moved toward and away from the toroidal magnetic core the output signal from the sense line, which is transformer coupled thereto, varies in amplitude. If the device being controlled by such a switch is a retriggerable one-shot, it may trigger the one-shot as a result of an extraneous noise signal which may occur during the slightest actuation of the switch. Because of noise a signal may pass above and below the trigger level of the one-shot connected thereto and inadvertently change the state of the retriggerable one-shot.

SUMMARY OF THE INVENTION

Accordingly, it is an object of this invention to provide a new and improved solid state switch which has more than one toroidal magnetic core associated therewith and which can have a single permanent magnet associated with both cores.

Another object of this invention is to provide output signals that can control a simple electronic circuit which will provide a constant indication of the switch position.

Still another object of the present invention is to provide an improved solid state switch which will prevent noise from causing false operations of a control device connected thereto.

A feature of the present invention is the incorporation of mechanical hysteresis of movement of magnet means between two positions so that saturation and unsaturation of the two toroidal magnetic cores may be accomplished simultaneously and uniformly. Movement of the magnet between the cores, from a first position where it saturates one core and unsaturates the other core, to a second position where it saturates the second core and unsaturates the first core, is accomplished linearly.

Another feature of this invention is that the drive line wound about the two cores is wound in the same direction. However, the two sense lines are wound about the respective different cores in opposite directions to provide out-of-phase signals with respect to the two associated loops or windings of each sense wire. Therefore, the output of each sense wire is the algebraic sum of the two windings. Also the two sense lines are arranged so that the algebraic sums of one is opposite in polarity with that of the other.

A unipolar drive signal energizes the primary winding which is formed by a drive line passing through each of the cores. Preferably the primary windings are a single turn of wire about each associated core. When one core is unsaturated the drive signal will be transformer coupled into the secondary winding, and no signal will be coupled into the secondary winding when the core is saturated. The secondary windings, which are the sense lines are also formed by single turns of wire about their associated magnetic cores. The sense wires pass through and are wound about their cores in such a manner so as to be in phase in one core and out of phase in the other core. Each sense wire is out of phase with the other so that signals of opposite polarity are derived at the different sense lines. This configuration provides a voltage on each of the sense lines which is the algebraic sum of the voltage induced by the drive signal. When the magnet is not saturating either core, no induced voltage is seen at the end of either sense wire since the algebraic sum is zero. The electrical and physical arrangement of the toroidal magnetic cores and the movable magnet provide hysteresis of sufficient reliability to insure that output signals will be sufficient to trigger logic circuits only when the magnet is moved to given positions. Mechanical hysteresis is the distance that the magnet must move to reach one threshold from the other.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
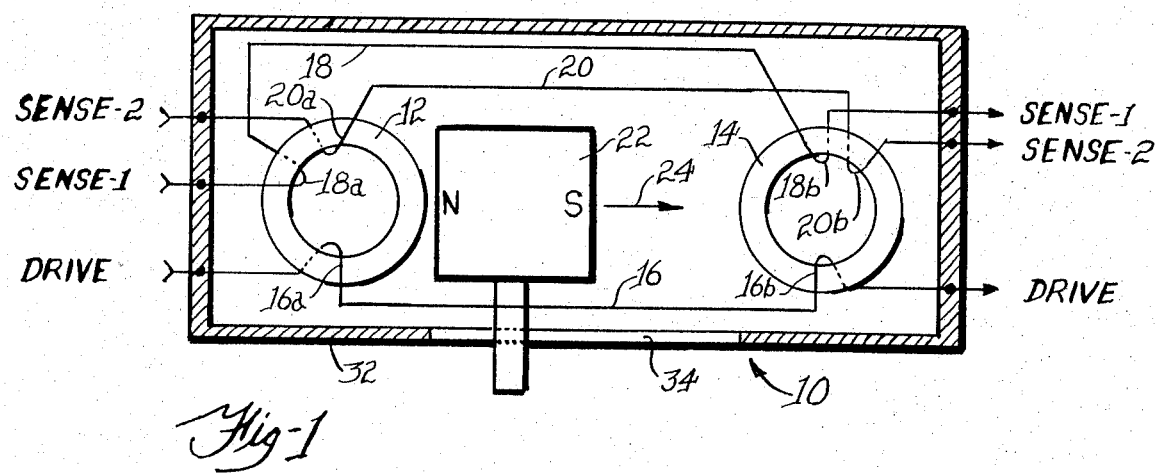
FIG. 1 is a diagrammatic representation of a solid state switch constructed in accordance with the principles of this invention.

Referring now to FIG. 1 an illustrated embodiment of the present invention is shown substantially diagrammatically and is designated generally by reference numeral 10. The solid state switch structure 10 includes first and second toroidal magnetic cores 12 and 14 located a predetermined distance apart from one another. The toroidal magnetic cores function as transformer coupling devices when in an unsaturated condition. However, when the cores are saturated as a result of the presence of a magnetic field of predetermined field strength, no transformer coupling occurs through the cores. A drive wire 16 passes through both cores, preferably arranged having single turn windings 16a and 16b associated with each core 12 and 14 respectively. Unipolar drive signals energize the single turn primary winding 16a and 16b in each core simultaneously.

A pair of sense wires 18 and 20 are associated with each of the toroidal magnetic cores 12 and 14 to receive signals induced therein as a result of transformer coupling from the drive wire 16. Preferably, the sense wire 18 has single turn windings 18a and 18b associated with the toroidal magnetic cores 12 and 14, respectively, these windings being in the opposite direction, or of opposite polarity producing configuration with respect to one another. Similarly, the sense wire 20 has single turn windings 20a and 20b associated with the toroidal magnetic cores 12 and 14, respectively. Here also the direction of the turns on the cores are in opposite directions with respect to one another, and in opposite directions with respect to the associated winding of the sense line 18. In other words, the direction of the winding 18a forming the secondary of the transformer is opposite to the direction of the winding of the winding 20a forming a second winding of the same transformer. The direction of the winding 18a is also opposite to its associated winding 18b on the other transformer. The direction of the winding 18b therefore, is opposite to the winding of the winding 20b which, in turn, is opposite to the direction of the winding 20a. Therefore, when a pulse is transformer coupled from the drive winding 16a it will be induced into the winding 18a and into the winding 20a with opposite polarity. Similarly, transformer coupling of pulses from the drive winding 16b will induce opposite polarity pulses in its associated single turn winding 18b and 20b. Since the associated winding with each of the sense lines are of opposite polarity they will add algebraically at their outputs. Therefore, when the output of each toroidal magnetic core is substantially the same, the net result of the outputs is substantially zero.

Magnet means is provided to selectively saturate and unsaturate the toroidal magnetic cores 12 and 14 to operate the switch structure of this invention. Most advantageously, the magnet means is a permanent magnet 22 linearly movable toward and away from the respective magnet as indicated by the arrowed line 24. When the magnet is in the position shown in FIG. 1, toroidal magnetic core 12 is completely saturated while toroidal magnetic core 14 is unsaturated. Therefore, there will be no transformer coupling from the drive winding 16a to its associated sense windings 18a and 20a, and there will be transformer coupling between the drive windings 16b and its associated sense windings 18b and 20b.

Figure 2:
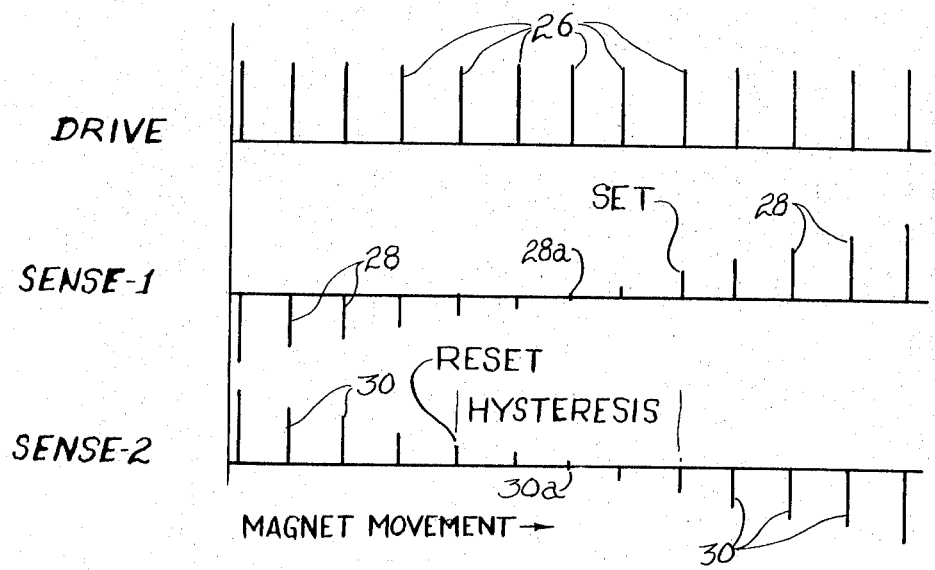
FIG. 2 represents diagrammatically a series of waveforms which when delivered to the drive line generate the waveforms at the sense lines of the switch of FIG. 1.
Figure 3:
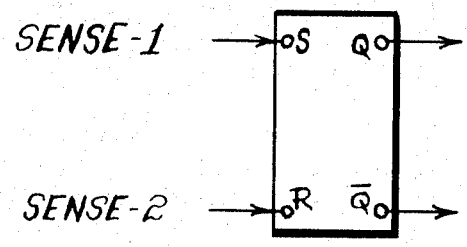
FIG. 3 represents a RS flip-flop logic circuit which can be controlled reliably by the output of the switch of FIG. 1.

This condition is best illustrated by the series of waveforms shown in FIG. 2. A plurality of unipolar pulses 26 are applied to the drive line 16. The toroidal magnetic core 12 is saturated and the toroidal magnetic core 14 is unsaturated and only transformer coupling of the unidirectional pulses 26 will occur at the core 14. Since the respective sense windings associated with each sense line are wound in opposite directions the output signals obtained therefrom are the algebraic sum. Therefore, the output signal at sense line 18 is shown by the plurality of pulses 28, these pulses being indicated as decreasing in negative polarity to a central point 28a and then increasing to a positive polarity as a result of movement of the magnet from left to right. On the other hand, the output signal of sense line 20 is shown by the plurality of pulse signals 30, they being initially positive and decreasing to a central zero point 30a and then increasing in magnitude in the negative polarity. Movement of the magnet 22 in the opposite direction, i.e., from right to left, will produce the opposite affect. Points 28a and 30a occur when the output of both cores is equal absolutely to each other, this condition can exist for longer movements. Therefore, by connecting the sense lines 18 and 20, as labelled sense −1 and sense −2 throughout the drawings to a logic circuit as shown in FIG. 3 positive control of the logic circuit is obtained. The logic circuit shown here is a RS flip-flop, it being understood that other types of logic circuits can be controlled by the novel switch structure shown herein.

By incorporating a flip-flop circuit of the RS type a minimum threshold voltage value is required and reset inputs thereof to change the state of the flip-flop thereby providing a constant indication of the switch position. Therefore, this threshold voltage value can be selected to occur along the decreasing and increasing slopes of the pulses 28 and 30. This will then provide electrical and mechanical hysteresis of a given range of movement of the magnet. It will also insure that upon moving the magnet to within a predetermined distance of either one of the toroidal magnetic cores, the flip-flop circuits will receive sufficient input signals to change their state. If the output of the switch is fed to some logic circuits the output pulses from the sense line would simulate rapid actuation of the switch.

The toroidal magnetic cores 12 and 14 together with their associated drive and sense wires are shown in a housing structure 32 having an elongated slot 34 formed therein. A stem portion 36 extends through the slot and is secured to the movable magnet 22 to effect its lateral linear movement. The stem may be actuated manually or by other means such as automatic electrical actuation if desired. The housing structure 32 may be provided with a plurality of terminals at the exterior thereof for connection in circuit with other leads.

While a single embodiment of this invention has been disclosed herein it will be understood that variations and modifications may be effected without departing from the spirit and scope of the novel concepts as set forth in the depending claims.

The invention is claimed as followed:

1. An electrical switch comprising first and second spaced-apart saturable magnetic cores, a drive winding passing through said first and said second magnetic cores for receiving a single polarity input signal, first and second sense windings passing through both said first and said second magnetic cores and magnetic means movable adjacent said first and second magnetic cores which is capable of saturating either said first magnetic core or said second magnetic core to a controlled degree according to its proximity thereto, said drive winding and said first and second sense windings being wound so that the signals induced in the said first and second sense windings are at a minimum magnitude and said first and second cores are both unsaturated when said magnetic means is positioned at a predetermined intermediate location, said first and said second sense windings providing output signals of a controlled magnitude which have opposite polarities when said first magnetic core is saturated to a controlled degree less than full saturation and output signals of a controlled magnitude which have opposite polarities when said second magnetic core is saturated to a controlled degree less than full saturation wherein said signals produced when said second magnetic core is partially saturated are the inverse with respect to polarity of the corresponding signals produced when said first magnetic core is partially saturated.

2. The switch of claim 1 wherein said magnetic means is a permanent magnet having north and south poles with its north pole facing said first magnetic core and its south pole facing said second magnetic core, said drive winding is wound in a first direction through said first magnetic core and in an opposite direction through said second magnetic core, said first sense winding is wound in a first direction through both said first and said second magnetic cores and said second sense winding is wound in a second direction which is opposite to said first direction through both said first and said second magnetic cores.

3. The switch of claim 2 further comprising bistable means wherein said first sense winding is coupled to the set input terminal of said bistable means and said second sense winding is coupled to the reset input terminal of said bistable means.

4. The switch of claim 3 wherein said magnetic means is a permanent magnet having north and south poles with its north pole facing said first magnetic core and its south pole facing said second magnetic core, said drive winding is wound in a first direction through said first magnetic core and in an opposite direction through said second magnetic core, said first sense winding is wound in a first direction through both said first and said second magnetic cores and said second sense winding is wound in a second direction which is opposite to said first direction through both said first and said second magnetic cores.

* * * * *